United States Patent
Hind et al.

(10) Patent No.: US 11,455,493 B2
(45) Date of Patent: Sep. 27, 2022

(54) EXPLANATIONS FOR ARTIFICIAL INTELLIGENCE BASED RECOMMENDATIONS

(71) Applicant: International Business Machines Corporation, Armonk, NY (US)

(72) Inventors: Michael James Hind, Cortlandt Manor, NY (US); Murray Scott Campbell, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1170 days.

(21) Appl. No.: 15/981,340

(22) Filed: May 16, 2018

(65) Prior Publication Data

US 2019/0354805 A1 Nov. 21, 2019

(51) Int. Cl.
G06K 9/62 (2022.01)
G06N 20/00 (2019.01)
G06N 20/10 (2019.01)

(52) U.S. Cl.
CPC ........... G06K 9/6257 (2013.01); G06K 9/626 (2013.01); G06K 9/629 (2013.01); G06N 20/00 (2019.01); G06N 20/10 (2019.01)

(58) Field of Classification Search
CPC ...... G06K 9/6257; G06K 9/626; G06K 9/629; G06N 20/00

(Continued)

(56) References Cited

U.S. PATENT DOCUMENTS 8,095,480 B2   1/2012   Kristal et al.
8,131,756 B2   3/2012   Carus et al.
(Continued)

FOREIGN PATENT DOCUMENTS

CN          103258239 A       8/2013

OTHER PUBLICATIONS

International Search Report and Written Opinion received for PCT Application Serial No. PCT/IB2019/053721 dated Aug. 26, 2019, 9 pages.

(Continued)

*Primary Examiner* — Jeffery A Williams
(74) *Attorney, Agent, or Firm* — Amin, Turocy & Watson, LLP

(57) ABSTRACT

Techniques regarding explanations for artificial intelligence recommendations are provided. For example, one or more embodiments described herein can comprise a system, which can comprise a memory that can store computer executable components. The system can also comprise a processor, operably coupled to the memory, and that can execute the computer executable components stored in the memory. The computer executable components can include: a combination component that receives a first training dataset comprising first feature vectors, first classes and first explanations, and combines the first classes and the first explanations to produce first augmented labels and a second training dataset that comprises the first feature vectors and the first augmented labels; a classifier, trained on the second training dataset, that analyses second feature vectors and generates second augmented labels; and a decomposing component that decomposes the second augmented labels, using the classifier, to generate second classes and second explanations.

20 Claims, 10 Drawing Sheets

(58) Field of Classification Search
USPC .......................................................... 706/12
See application file for complete search history.

(56) References Cited

U.S. PATENT DOCUMENTS

| | | |
|---|---|---|
| 8,533,148 B1 | 9/2013 | Feuersanger et al. |
| 2017/0286844 A1 | 10/2017 | El Mernissi et al. |
| 2018/0293292 A1* | 10/2018 | Odibat ................. G06K 9/6282 |

OTHER PUBLICATIONS

Hind, "Teaching AI to Explain its Decisions," 31st Conference on Neural Information Processing Systems (NIPS), 2017, 14 pages.
Sun et al., "Explanation-Augmented SVM: an Approach to Incorporating Domain Knowledge into SVM Learning," Proceedings of the 22nd International Conference on Machine Learning, 2005, 8 pages.
Samek et al., "Explainable Artificial Intelligence: Understanding, Visualizing and Interpreting Deep Learning Models," arXiv:1708.08296v1 [cs.AI], Aug. 28, 2017, 8 pages.
Lim et al., "Explanation-Based Feature Construction," IJCAI, vol. 7, 2007, pp. 931-936, 6 pages.

* cited by examiner

EXPLANATIONS FOR ARTIFICIAL INTELLIGENCE BASED RECOMMENDATIONS

BACKGROUND

One or more embodiments relate to decision-making using electronic devices, and more specifically, to decision-making using artificial intelligence technology.

SUMMARY

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can autonomously provide recommendations and explanations using artificial intelligence technology are described.

According to an embodiment, a system is provided. The system can include a memory that stores computer executable components. The system can also include a processor, operably coupled to the memory, and that can execute the computer executable components stored in the memory. The computer executable components can include: a training component that can receive a first training dataset including first feature vectors, first classes and first explanations, and a combination component that can combine the first classes and the first explanations to produce first augmented labels and a second training dataset that includes the first feature vectors and the first augmented labels; a classifier, trained on the second training dataset, that can analyze second feature vectors and can generate second augmented labels; and a decomposing component that can decompose the second augmented labels, using the classifier, to generate second classes and second explanations.

According to one or more example embodiments, a computer-implemented method is provided. The computer-implemented method includes: receiving, by a training component operatively coupled to the processor, a first training dataset including first feature vectors, first classes and first explanations, and combining, by a combination component operatively coupled to the processor, the first classes and the first explanations to produce first augmented labels and a second training dataset that includes the first feature vectors and the first augmented labels; using, by a recommendation component operatively coupled to the processor, a classifier, trained on the second training dataset, to analyse second feature vectors and generate second augmented labels; and decomposing, by a decomposition component operatively coupled to the processor, the second augmented labels, using the classifier, to generate second classes and second explanations.

According to yet one or more example embodiments, a computer program product is provided. The computer program product can include a computer readable storage medium having program instructions embodied therewith. The program instructions can be executable by a processor to cause the processor to: receive, by a training component operatively coupled to the processor, a first training dataset including first feature vectors, first classes and first explanations, and combine, by a combination component operatively coupled to the processor, the first classes and the first explanations to produce first augmented labels and a second training dataset that includes the first feature vectors and the first augmented labels; use, by a recommendation component operatively coupled to the processor, a classifier, trained on the second training dataset, to analyse second feature vectors and generate second augmented labels; and decompose, by a decomposition component operatively coupled to the processor, the second augmented labels, using the classifier, to generate second classes and second explanations.

DETAILED DESCRIPTION

Figure 1:
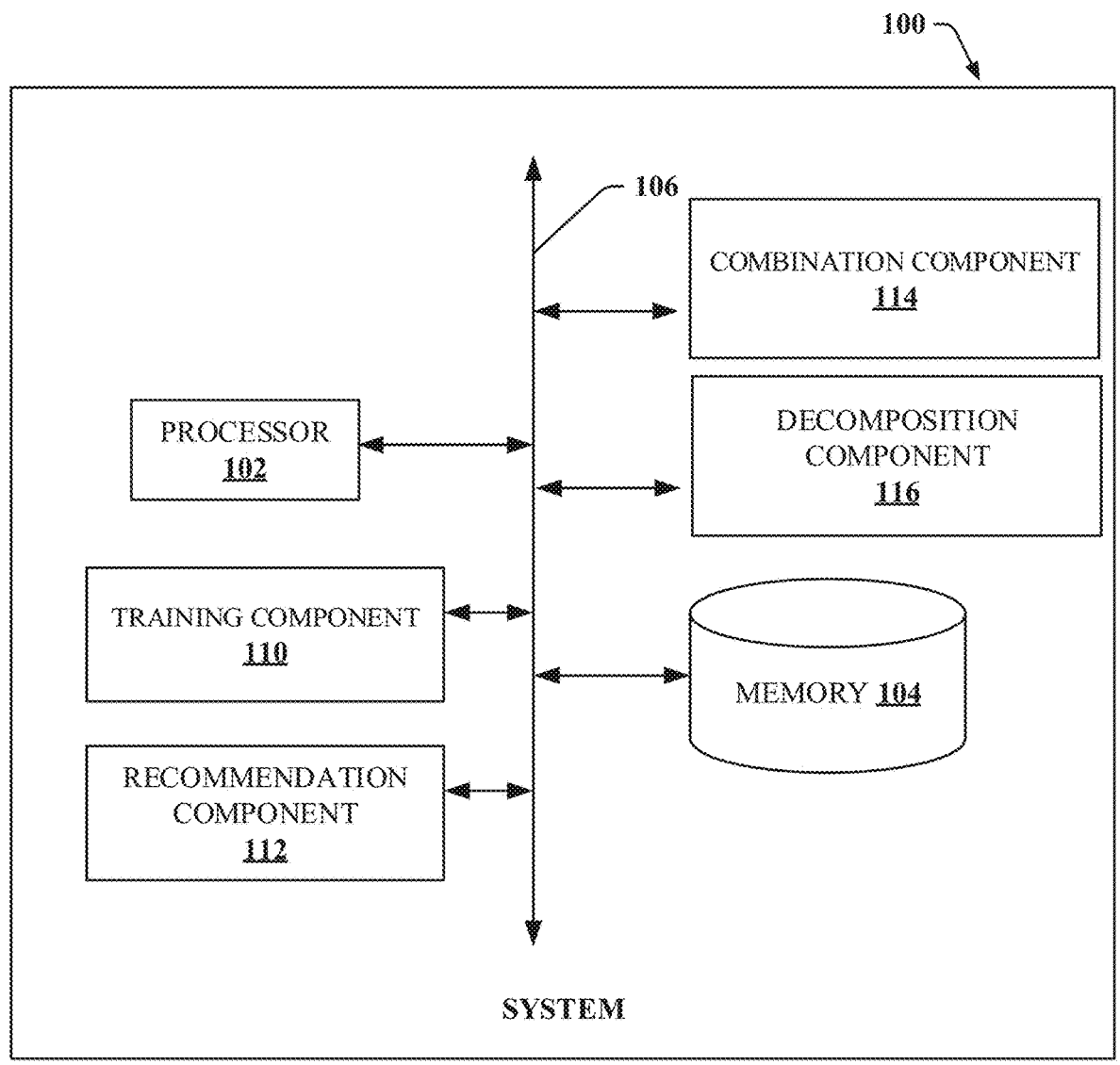
FIG. 1 shows a block diagram of an example, non-limiting system for providing AI-produced recommendations along with explanations, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some aspects, the terms "class," "classification," "decision," or "recommendation" may be used interchangeably herein, unless specified otherwise.

Artificial intelligence (AI) can refer to intelligence demonstrated by machines, in contrast to the natural intelligence displayed by humans. In some aspects, AI technology can be used in real-life and/or simulated situations to increase the accuracy, consistency, and fairness of decisions beyond what individuals may be able to achieve on their own. However, inherent biases, for example, biases in training data used to train the AI systems, may result in such systems making biased decisions and recommendations. Further, such biases may be amplified by the procedures implemented by various AI algorithms themselves. Such biases may lead to the reduction of trust placed by users in AI systems and AI system recommendations. Accordingly, there is a need for AI systems to provide explanations for the AI systems' recommendations and decisions. Such explanations may increase the level of trust placed by users in AI systems and AI system recommendations.

In some aspects, explanations are inherent to human communication. Further, in contrast to developing a formal definition for what constitutes valid human-to-human explanations, developing a definition for system-to-human explanations can have challenges. For example, in mathematics, proofs can be used to formally provide an explanation. Such proofs may be constructed using an agreed-upon logic and formalism; accordingly, a person trained in the field can agree upon the validity of the proof. However, outside of a mathematical framework, real-life situations may not employ a proof formalism, particularly for non-technical explanations provided to a non-technical audience. For example, even in formal social situations such as those in the judicial system, non-expert jurors may be used to determine if a defendant has violated a law. Such non-experts may rely on their intuition and experience in weighing informal arguments made, for example, by the prosecution and the defense in a given case.

In some aspects, an explanation may be a communication from one person (A) to another (B) that can provide justification for an action taken or a decision made by person A. Sufficient justification may thereby lead to an increase in trust placed by person B in person A's decision-making ability. This justification may be made informally and may be iterative; further, both participants may check the each other's understanding during the communication of the justification, for example, using phrases that are variants of "Do you understand?" (A) or "I do (or don't) understand" (B). In some embodiments, AI systems can be used to provide explanations in addition to or instead of individuals. In such a case, person A can be replaced by or augmented with an AI system, as described herein.

One approach to providing explanations includes providing a detailed description of how the AI system constructs particular recommendations. Such an approach may be particularly beneficial to AI system builders and/or stakeholders. In some aspects, this approach can be analogous to debugging a non-AI computer application, where the computer application is run with a debugger enabled. In this way, the system can be monitored while it is operating to detect and observe various system responses of interest. However, such an approach may be more challenging in an AI system because the model component of the computer application may not have been written by a human but may be generated via training and may therefore be difficult to comprehend.

Further, developing such an interpretable approach to model the recommendation process can be challenging in cases involving models based on machine learning techniques that are inherently less interpretable, such as neural networks. Moreover, the model component of the computer application may need to be used within the context of the broader computer application, the internal interactions of which can further impact the decisions and explanations. Accordingly, the impact of such decisions may need to be considered in any explanations produced from such an approach.

In various embodiments, the disclosure describes systems, methods, and apparatuses for providing explanations for a particular recommendation, and such explanations may be distinct from an explanation of the operation of an AI system independent of any specific input. That is, the explanations may be distinct from models or a global explanation. In some embodiments, the disclosure describes ways to ask an entity (for example, a subject matter expert, or an explanation consumer) to train the AI system by demonstrating valid explanations in the training data and use this training to generate explanations for the system's recommendations. This can thereby avoid the difficulties with trying to understand the details of a particular AI model and the system it is a part of and the difficulties with mapping this understanding to a given complexity level and domain a human can understand. Accordingly, embodiments of the disclosure may increase the likelihood that explanations provided by the system will match the complexity level and domain of the users. Further, the additional training may not add a relatively large burden to the training time and may improve the overall accuracy of the training data.

In particular, the disclosure describes a system that can operate in two modes, a training mode and an application mode. In the training mode, the system can receive as input, a training dataset including feature vectors in addition to classifications and explanations corresponding to the feature vectors. The explanations can be provided by a subject matter expert. The system can further combine the classifications and explanations to produce first augmented labels. Further, the system generates another updated training dataset that includes the feature vectors and the augmented labels. In the application mode, the system can use a classifier, trained on the updated training dataset, to analyse real-world (non-training) feature vectors and thereby generate corresponding real-world augmented labels. Further, the system can decompose the real-world augmented labels, using the classifier, to generate classifications and explanations for real-world feature vectors. In this way, the system can provide explanations for real-world classifications of given feature vectors.

In some aspects, one or more embodiments of the disclosure can include a complexity and/or a domain match, where explanations provided by the systems, methods, and apparatuses can be matched to the complexity and the technical framework of a domain, given that they are created by the domain expert who is training the system. In other aspects, one or more embodiments of the disclosure can provide for an increase in explanation accuracy by AI systems. For example, explanations may have high accuracy if the training data is accurate and is representative of production data.

In some aspects, the systems, methods, and apparatuses described herein may be independent of the machine-learning classification algorithm; any supervised learning classification algorithm can be used, including neural networks, making this technique widely deployable. For example, multiclass machine-learning algorithms that can be used include, but are not limited to, a support vector machine learning algorithm, a nearest-neighbor machine-learning algorithm, a deep-learning algorithm, an extreme classification algorithm, a recursive leaning algorithm, a hierarchical learning algorithm, a random forest algorithm, and the like.

In some embodiments, the systems, methods, and apparatus can be relatively simple to implement from a coding and computational perspective, thereby reducing the likelihood of generating computational bugs which can hinder implementation.

In another aspect, the systems, methods, and apparatus can educate consumers and end-users. One challenge of providing suitable explanations for a given domain that can involve creating the training data set. Embodiments of the disclosure may enable ways to set expectations for what kind of explanations the AI systems can realistically provide. For example, may be easier for the system to explain, using the training data set, why a particular loan application is denied than to explain why a particular photo represents a cat. Accordingly, different expectation levels can be set for the customer regarding explanations for the former case as compared with explanations for the latter case. Setting customer expectations correctly for AI systems may improve customer satisfaction with the systems.

In some embodiments, the systems, methods, and apparatus can provide improved auditability for entities (e.g., organizations and companies) employing the disclosed AI systems. For example, after creating a training data set including explanations, a subject matter expert may have effectively enumerated the possible explanations for a particular decision. Such an enumeration of the possible explanations may be useful for protection against being audited. For example, the explanations may serve to answer questions such as, "What are all possible reasons why you will deny a loan?" or "What are the situations in which you will prescribe medical treatment X?" Such questions may be used in an audit or audit-like procedure against an entity.

In some embodiments, embodiments of the disclosure can enable the reduction of bias in decision-making procedures. In particular, providing explanations may increase the likelihood of detecting bias in the training data at least because a biased decision will likely be harder for a subject matter expert to justify with an explanation. Further, instances of training data having the same or similar explanations may cluster close to each other in a corresponding feature space. Accordingly, further algorithms for detecting anomalies based on such a clustering property may be used to determine a bias and may trigger a need for more inputting more training data to the AI systems.

FIG. 1 illustrates a block diagram of an example, non-limiting system 100 for providing AI-produced recommendations along with explanations, in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a training component 110, a recommendation component 112, a combination component 114, and a decomposition component 116. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication component 114 that enable communication between the system, components, models, devices, etc. over one or more networks.

As mentioned, explanations may communicate a justification for a decision or an action from one entity to another. Accordingly, the consumer of an explanation needs to be able to understand the explanation. Accordingly, the recommendation component 112 can be configured to provide an explanation having a metric associated with the complexity of the explanation that matches a metric associated with the complexity-capability of the user. Such a complexity metric can take any suitable form, including, for example, a score that corresponds to the complexity of the explanation and the sophistication of the user. For example, a precise mathematically sophisticated equation specifying the reason for a decision may be appropriate for a statistician, but may not provide an understandable explanation for a nontechnical person. Furthermore, in many situations, simple, representative explanations may be preferred to more complex, but complete ones.

In some aspects, metrics for the performance quality of the system 100 described herein can include a metric associated with the accuracy of a classifier determined by the training component 110 and/or the recommendation component 112 versus a performance metric associated with the accuracy of a similar classifier determined by baseline conventional system and corresponding machine learning algorithm without explanations in the used data sets. In some aspects, if the accuracy of the system 100 and associated algorithms is below a given threshold, a larger training data set can be used by the training component 110 to determine how much more training data is needed to improve the performance of the system 100 as compared with the conventional system and machine learning algorithm that do not use such explanations. In some aspects, the training component 110 and/or the recommendation component 112 can use hierarchical multiclass classifiers to be described below to improve accuracy as compared with standard multiclass classifiers.

In some embodiments, the recommendation component 112 can be configured to provide explanations that are tailored to the domain of the recommendation, for example, by incorporating relevant terms. For example, an explanation for a medical treatment recommendation may need to use medical terms that are understandable by physicians and/or nurses considering the recommendation. In contrast, recommending a particular treatment because of a given AI system generated explanation, for example, that "X1>0.45"

and "X2<43.5" may not be useful to a user, regardless of the mathematical sophistication of the user, because X1 and X2 may have no inherent meaning to the user (e.g., a physician). However, a different explanation stating that "glucose counts are too high and blood pressure is too low," may be more informative to the user.

In some aspects, to further address the issue of matching the complexity and domain requirements by the system 100, the training component 110 can be configured such that a machine learning training process can be configured to ask, during the training process, that a subject matter expert trains the system 100 on what constitutes a valid explanation. More specifically, each instance of the training data provided to the training component 110 can be required to include an explanation in addition to the classification or decision. In some embodiments, the explanations used on the training data can be used to provide explanations for real-word data.

A non-limiting example use-case for such a system 100 that may be referenced herein for clarifying certain embodiments of the disclosure can involve a system 100 that receives answers to loan application questions and produces a recommendation to approve or reject the loan application. In order for such a system 100 to provide explanations for its recommendations, training data provided to the training component 110 can be augmented with subject matter expert provided explanations. For example, training recommendations for rejection instances might include textual explanations like "insufficient salary," "too much existing debt," "insufficient job stability, "insufficient home stability," "incomplete application," and the like. Such explanations may be relevant to the target domain (e.g., the domain of banking) and may meet the complexity level of the user which consumes the explanations (e.g., a loan officer and/or a loan applicant). In some embodiments, the system 100 can use the training explanations provided by a subject matter expert (e.g., a loan officer or banking official) as a basis for explanations regarding decisions made on new loan application.

In some embodiments, the system 100 may leverage existing machine classification technology in a straightforward way to generate, by training component 110 and/or the recommendation component 112, a classifier that produces explanations along with corresponding classifications. In some embodiments, to create a supervised machine learning classifier, a set of training data may need to be provided to the training component 110, the training data having two components. The first component can include a set of feature vectors, x, for a particular entity. Examples of such feature vectors can include, but not be limited to, an image, video, audio, text, and the like. For example, for a loan application, information on the loan can be described in text format as a part of the feature vector. The second component can include a decision and/or classification, y, for each feature vector. Examples of such a decision and/or classification can include, but not be limited to, a description for an image, video, or audio, a summary for a paragraph of text, a loan-approval decision for a loan application, and the like.

Further, the training component 110 can further receive a third component for each element (x,y) in the training data. In particular, a set of explanations, z, for why the features, x, produced the specified class, y. In some embodiments, z can take any suitable form, such as a number, text string, an image or video file, and the like. In some embodiments, each z can be represented with a unique identifier. The combination component 114 can combine y and z to train a model that will output both classes (y) and explanations (z) on new x inputs, as will be further described below.

In some embodiments, the input to the training component 110 can include a set of training feature vectors x. Moreover, the input to the training component 110 can include classifier y which can include a set of correct classes for each feature vector x. Further, the input to the training component 110 can include a set of explanations z that correspond to each feature vector.

In some embodiments, the output of the recommendation component 112 can include the real feature vectors to classify, which can be referred to as $x_{real}$. Moreover, the output of the recommendation component 112 can include the predicted classes for each feature vector, which can be referred to as $y_{predict}$. Finally, the predicted explanations for each feature vector and class prediction, which can be referred to as $z_{predict}$.

In some aspects, each instance of y and z can be combined or merged, via the combination component 114, into a unique augmented label yz. Then, a 3-tuple(x, yz) can be used as training input into an AI technique, such as any standard supervised machine learning classification algorithm (for example, a support vector machine (SVM) algorithm, a nearest neighbor (NN) algorithm, and the like). The AI technique can produce a classifier, C, where x can represent the set of feature vectors and the augmented label yz is a class corresponding to those feature vectors. The classifier C can be used to classify new data instances which can be represented as feature vectors $x_{real}$ (corresponding to real-world data) and thereby produce a class $y_{output}$. The decomposition component 116, $y_{output}$ can be decomposed, using a decomposition component 116, and using the inverse process used by the combination component 114 described above, in order to produce the predicted class $y_{predict}$ and the predicted explanation $z_{predict}$.

In some aspects, a baseline (x,y) classifier (that is, a classifier without explanations z) can be used, by the recommendation component 112, for performing a prediction on a future x values; then the (x, yz) classifier including explanations can be used for producing explanations. In some aspects, the (x, yz) classifier and the (x, y) classifier may predict different y values. In some a situation, using the baseline classifier would possible yield a better classification and may signal the need for more training data for the training component 110. In another aspect, disagreements in the two classifiers may show cases where further investigation may be needed (such as more training data or better refinement of explanation classes). For example, such a case may indicate that similar training x values are mapping to two different explanations z, and therefore signal the need for a user or subject matter expert to intervene and/or retrain the system. In some aspects, a yz classifier can be trained on each class y; then the baseline xy classifier can be used to find the class y while the yz classifier can be used to find the explanation z. Such an embodiment can be similar to the hierarchical classifier (see, for example, FIG. 2 and/or FIG. 4 and related description), without necessarily requiring a hierarchical relationship between classification y and species z.

The various components (e.g. the training component 110, the recommendation component 112, the combination component 114, the decomposition component 116, and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
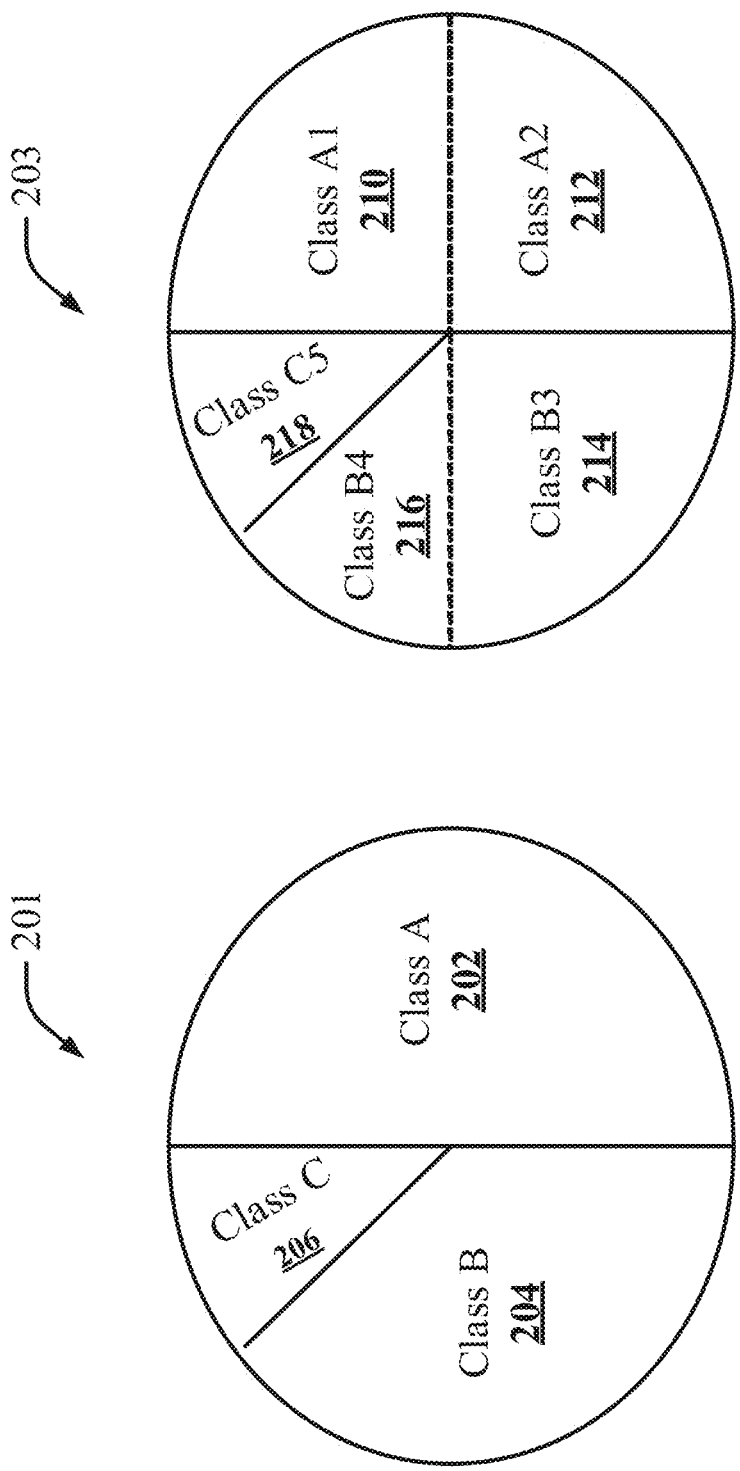
FIG. 2 shows a diagram of example classifications for a given data set, in accordance with example embodiments of the disclosure.

FIG. 2 shows a diagram of example classifications for a given data set, in accordance with example embodiments of the disclosure. In particular, FIG. 2 shows a first diagram 201 that includes three classifications, class A 202, class B 204, and class C 206. FIG. 2 further shows a second diagram 203 that includes five classifications, class A1 210, class A2 212, class B3 214, class B4 216, and class C5 218. In some embodiments, diagram 203 can represent a further specification of diagram 201, and thereby diagram 201 can represent a higher-level hierarchy of the classes as compared with the classes of diagram 203. In particular, class A1 210 and class A2 212 can represent species of the class A 202 of diagram 201. Similarly, class B3 214 and class B4 216 can represent species of the class B 204.

Diagrams 201 and 203 may be further explained via an example. For instance, a system in accordance with the disclosure can be trained to recommend cancer treatments. An example training set for such a system can include the following, where $P_i$ is the feature vector representing patient i and where $T_i$ represents various treatment recommendations: $(P_1, T_A)$, $(P_2, T_A)$, $(P_3, T_A)$, $(P_4, T_A)$, $(P_5, T_B)$, $(P_6, T_B)$, $(P_7, T_B)$, and $(P_8, T_C)$.

As described above, the disclosed AI system and corresponding algorithm may therefore require an additional explanation component in the data training set, $E_i$, as shown below: $(P_1, T_A, E_1)$, $(P_2, T_A, E_1)$, $(P_3, T_A, E_2)$, $(P_4, T_A, E_2)$, $(P_5, T_B, E_3)$, $(P_6, T_B, E_3)$, $(P_7, T_B, E_4)$, and $(P_8, T_C, E_5)$.

In some embodiments, each $E_i$ can represent an explanation that justifies why a feature vector representing a patient would map to a particular treatment. As the example shows, some treatments may have multiple explanations, that is, multiple explanations for why a particular treatment is recommended. For example, treatment $T_A$ may be recommended for two different reasons, E1 and E2, while treatment $T_C$ may only be recommended for reason $E_5$.

Given this augmented training data, the disclosed techniques can transform the triplet into a form that any given machine learning algorithm (e.g., any standard supervised machine learning algorithm) can use. In particular, the triplet can be transformed into a tuple of the form (feature, class) that machine learning algorithms typically process. This transformation can be performed by combining the second and third components into a unique new class as follows: $(P_1, T E_{A1})$, $(P_2, T E_{A1})$, $(P_3, T E_{A2})$, $(P_4, T E_{A2})$, $(P_5, T E_{B3})$, $(P_6, T E_{B3})$, $(P_7, T E_{B4})$, and $(P_8, T E_{C5})$.

In view of the example provided above, FIG. 2 shows diagrams 201 and 203 of how the training data set may change after applying the stated transformation and using the disclosed algorithm. In particular, diagram 201 illustrates that the eight training instances in the example can be mapped to the three classes (class A 202, class B 204, and class C 206). Diagram 203 illustrates that classifications when the training data is changed, that is, as explanations are added to the training data. In particular, class A 202 can be decomposed to classes A1 210 and A2 212; further class B can be transformed to classes B3 214 and B4 216 and class C remains class C5 218. Moreover, diagram 203 illustrates that, adding explanations to training data implicitly creates a two-level hierarchy. That is, the transformed classes of diagram 203 are members of the original classes of diagram 201. In particular, classes A1 210 and A2 212 represent a decomposition of the original class A 202, and similarly for class B. This hierarchical property may be exploited by employing hierarchical classification algorithms when training data to improve accuracy. Furthermore, the explanations maybe expanded to include multiple levels of detail, for example, depending on the needs of a user.

Figure 3:
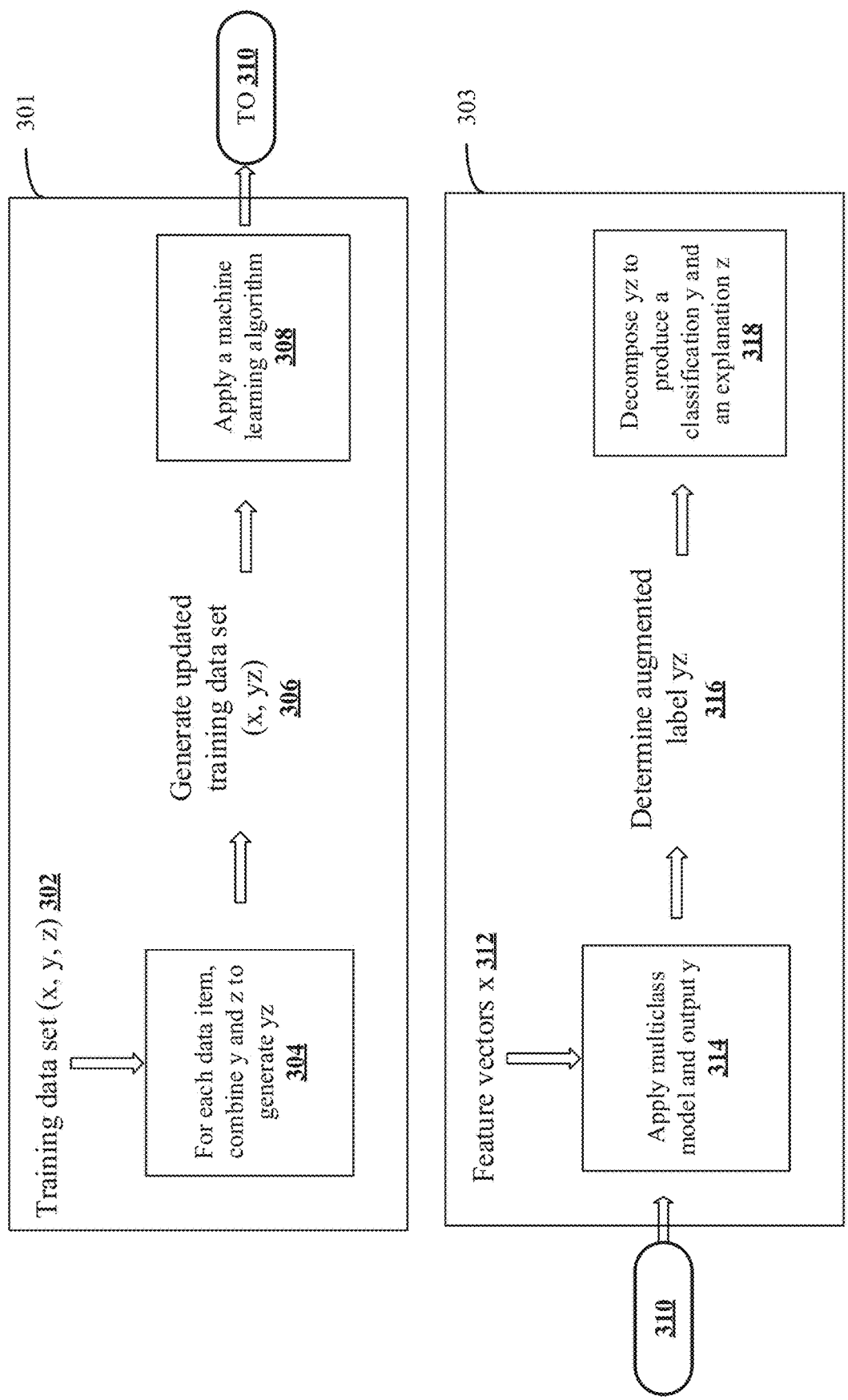
FIG. 3 shows diagrams of an example implementation of an AI system that provides explanations of its recommendations, in accordance with example embodiments of the disclosure.

FIG. 3 shows diagrams of an example implementation of an AI system that provides explanations of its recommendations, in accordance with example embodiments of the disclosure. Repetitive description of like elements employed in one or more embodiments described herein is omitted for sake of brevity. In particular, diagram 301 can represent a training component of the system. In some embodiments, a training data set 302 can be received by the system. The training data set 302 can include an (x,y,z) element, where x represent a feature vector, y represents a classification or decision, and z represents an explanation.

At block 304, the system can, for each data item in the training data set 302, combine the classification y with an explanation z, thereby generating an augmented label yz. In some aspects, the augmented label can be a concatenation of y and z, or may be a more sophisticated combination for y and z (e.g., a hashed combination). At block 306, the system can generate an updated training data set (x, yz), based on the augmented label, yz.

At block 308, the system can apply a machine learning algorithm to the updated training data set, thereby leading to the generation of a model (e.g., a multiclass model). The output of the system can be used, at 310, to a recommendation component 303, which can apply the model based on the updated training data set (x, yz) to real-world data. In particular, the system can receive real-world data that can include a feature vector x 312. At 314, the system can apply the model (e.g., the multiclass model) and thereby generate as an output, a classification, y. At 316, the system can determine an augmented label yz based on the generated classification y. At 318, the system can decompose yz and generate a classification y and an explanation z.

Figure 4:
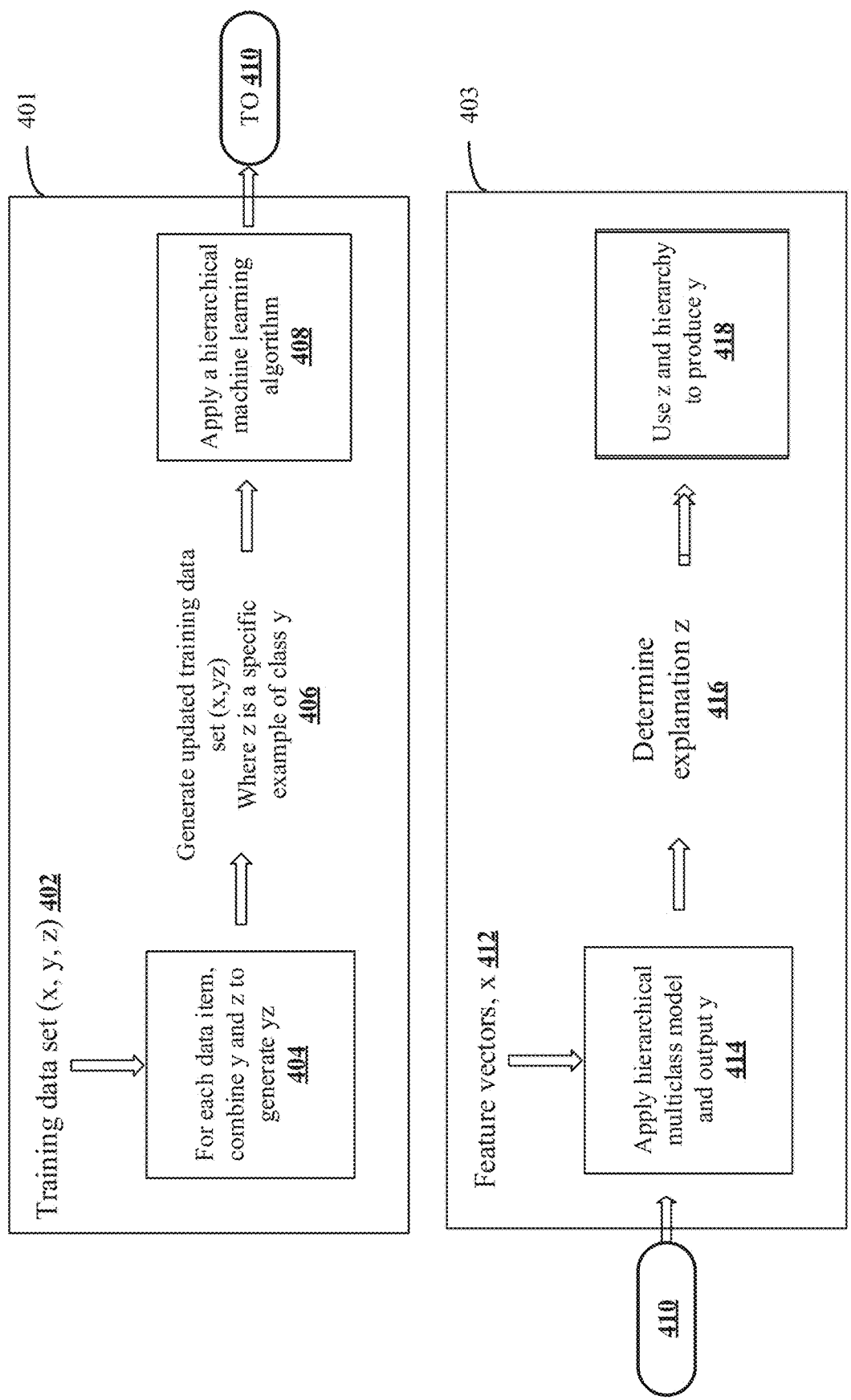
FIG. 4 shows diagrams of another example implementation of an AI system that provides explanations of its recommendations, in accordance with example embodiments of the disclosure.

FIG. 4 shows diagrams of another example implementation of an AI system that provides explanations of its recommendations, in accordance with example embodiments of the disclosure. Repetitive description of like elements employed in one or more embodiments described herein is omitted for sake of brevity. In particular, diagram 401 can represent a training component of the system. In some embodiments, a training data set 402 can be received by the system. The training data set 402 can include an (x,y,z) element, where x represents a feature vector, y represents a classification or decision, and z represents an explanation. At block 404, the system can, for each data item in the training data set 402, combine the classification y with an explanation z, thereby generating an augmented label yz. At block 406, the system can generate an updated training data set (x, yz), based on the augmented label, yz, where z includes a specific example of class y (e.g., z is in a hierarchical relationship with y and represents a species of class y). At block 408, the system can apply a hierarchical machine learning algorithm to the updated training data set, thereby leading to the generation of a model (e.g., a hierarchical multiclass model). In some aspects, one or more extreme classification algorithms can be used to handle cases where there is a large number of classes to be processed by the system. The output of the system can be used, at 410, to a recommendation component 403, which can apply the model based on the updated training data set (x, yz) to real-world data. In particular, the system can receive real-world data that can include a feature vector x 412. At block 414, the system can apply the model (e.g., the hierarchical multiclass model) and thereby generate as an output, a classification, y. At block 416, the system can determine an explanation z based on the generated classification y. At block 418, the system can use z and information related to the hierarchical relationship between z and y to generate a classification y.

Figure 5:
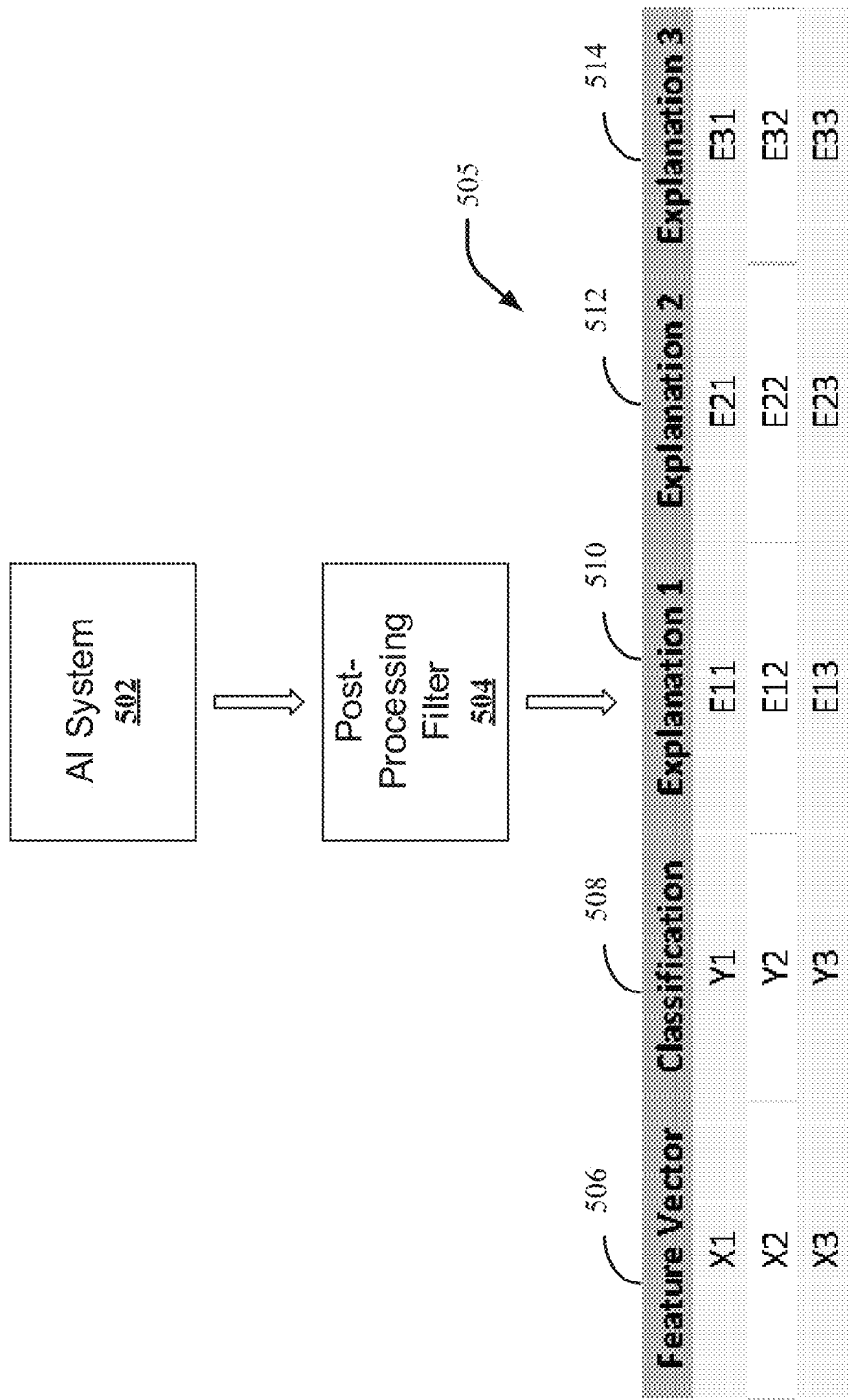
FIG. 5 shows an example diagram for post-processing operations to provide alternative explanations, in accordance with example embodiments of the disclosure.

FIG. 5 shows an example diagram for post-processing operations to provide alternative explanations, in accordance with example embodiments of the disclosure. Repetitive description of like elements employed in one or more embodiments described herein is omitted for sake of brevity. The diagram 500 can include a AI system 502. The AI system 502 can include various components as shown and described in connection with FIGS. 1, 3, and 4. In particular, AI system 502 may include processor 102, the memory 104, the training component 110, the recommendation component 112, the combination component 114, and/or the decomposition component 216.

Further, the AI system 502 may be configured to perform operations and/or procedures as shown and described in connection with FIGS. 3 and 4. In particular, the AI system 502 can provide an explanation z for a given feature vector x based on a model (for example, a multiclass model or a hierarchical multiclass model as discussed herein). The explanation z may be one of several explanations that may be associated with the pair (x,y); for example, the several explanations may be variations of each other. For instance, the explanations can be in different languages, described using different terminology and vocabulary, or be provided with different levels of detail for different users. Accordingly, the explanation provided by AI system 502 can be provided to a post-processing filter 504. The post-processing filter can, at 504, can determine a given user characteristic, for example, based on a user profile (not shown). The user-profile can be provided by a user, or may be provided via communication with a database, for example, a network database. The database can include a database stored or hosted on a cloud computing platform. In some aspects, the user characteristic can include, but not be limited to, a first or last name, a country, state, postcode or city of residence, an age, a biological classification, a name of the school they attend or workplace, an academic record, a salary, a job position, or the like.

In particular, the post-processing filter 504 can have access to a database including a table of information, for example, a look-up table such as look-up table 505. In some embodiments, the look-up table 505 can include a column of feature vectors 506, for example, including feature vectors X1, X2, and X3. In some embodiments, the look-up table 505 can include a column of classifications 508, for example, including classifications Y1, Y2, and Y3. In some embodiments, the look-up table 505 can include a column of first explanations 510, for example, including explanation E11, E12, and E13. In one embodiment, the first explanations can include those explanations that were originally provided to the AI system, for example, during the training or recommendation processes. In some embodiments, the look-up table 505 can further include columns of second explanations 512 (for example, explanations E21, E22, and E23) and third explanations 514 (for example, explanations E31, E32, and E33). In one embodiment, the second explanations 512 can include a second variation of the first explanations 510, and third explanations 514 can include a third variation of the first explanation 510 or the second explanations 514. For example, E21 can include a second variation of the first explanation E11. In one example, explanations E21 and E11 can have the same or similar content, but can be in different languages, described using different terminology and vocabulary, or be provided with different levels of detail for different users. Similarly, explanations E31 and E11 or E31 and E21 can have the same or similar content, but can be in different languages, described using different terminology and vocabulary, or be provided with different levels of detail for different users. In some embodiments, there can be more columns of explanations than what was shown in the example lookup-table 505, which is omitted for the sake of brevity.

In some embodiments, the content in the columns of the lookup-table 505, for example, the columns of explanation can be provided in abbreviated or coded format, for example, using a hashing function. Additionally, any number of internal mappings or memory reduction techniques and algorithms can be used to reduce the amount of data needing to be stored on a storage device, the storage device either associated with the network or provided locally.

Figure 6:
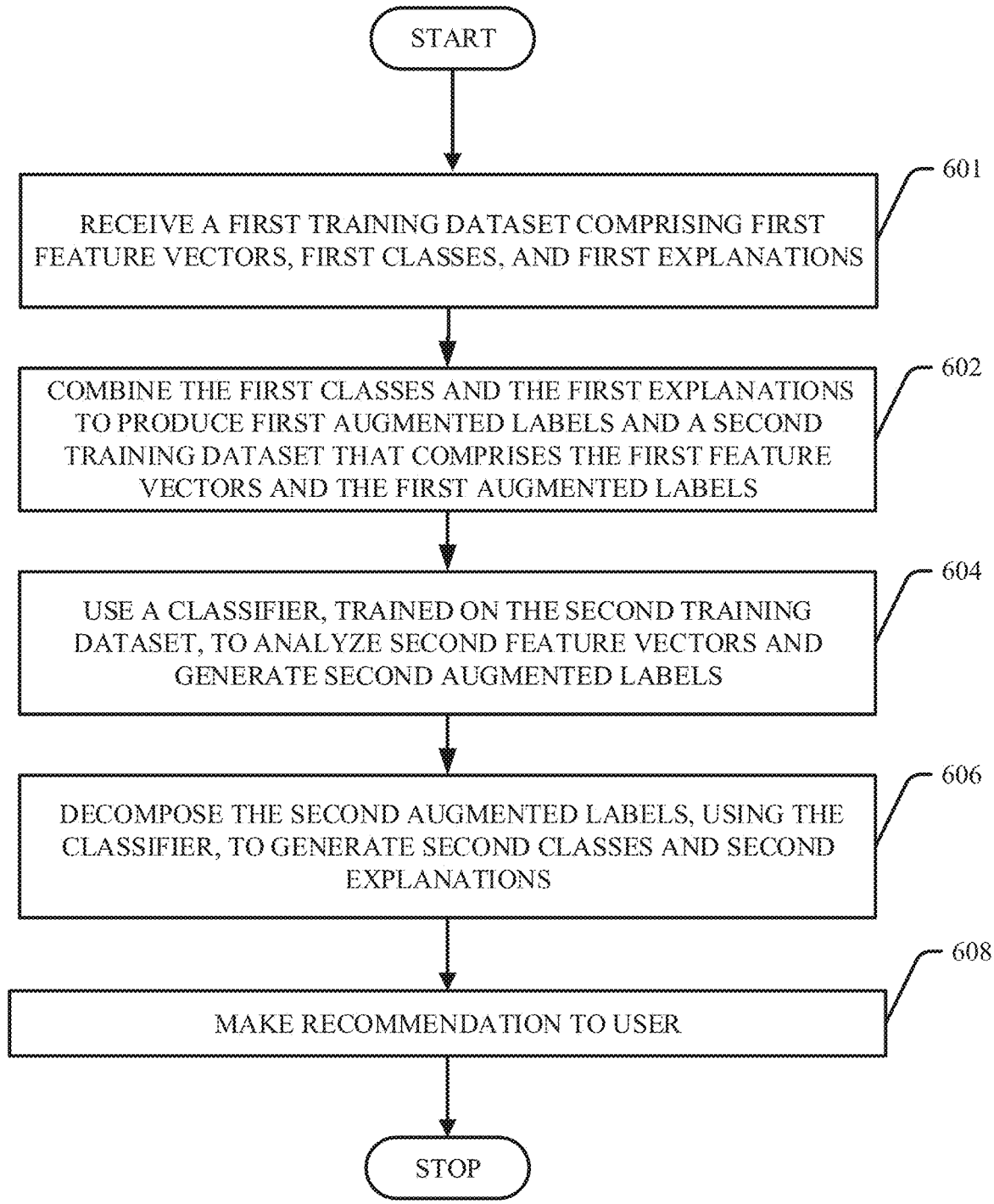
FIG. 6 shows a diagram of an example flowchart for operating aspects of the AI systems and algorithm, in accordance with example embodiments of the disclosure.

FIG. 6 shows a diagram of an example flowchart for operating aspects of the AI system and algorithm, in accordance with example embodiments of the disclosure. Repetitive description of like elements employed in one or more embodiments described herein is omitted for sake of brevity. At block 601, a first training dataset can be received; the first data set can comprise first feature vectors, first classes, and first explanations. In some aspects, the first explanations can include one or more of a number, a text string, an image file, an audio file, a video file, or the like. Moreover, the first explanations can be at least partially provided from a crowd-sourcing process for improved processing efficiency. For example, the feature vectors can be posted on a social media platform for users to provide explanations in return for a monetary award. In another example, the feature vectors and/or classifications can be shown to users on a password-protected network for the users to provide explanations, for example, as part of their normal job duties. Examples of feature vectors can include, but not be limited to, an image, video, audio, text, and the like. Examples of decision and/or classification can include, but not be limited to, a description for an image, video, or audio, a summary for a paragraph of text, a loan-approval decision for a loan application, and the like. The first explanations can provide reasons why the features produced the specified class. In some embodiments, the explanations can take any suitable form, such as a number, text string, an image or video file, and the like. In some embodiments, each explanation can be represented with a unique identifier.

At block 602, the first classes and the first explanations can be combined to produce first augmented labels and a second training dataset that comprises the first feature vectors and the first augmented labels. In some aspects, the augmented labels can include a concatenation of the first explanations and the first classes, or may be a more sophisticated combination for the first explanations and the first classes (e.g., a hashed combination).

At block 604, a classifier, trained on the second training dataset, can be used to analyze second feature vectors and generate second augmented labels. In some aspects, the classifier can be trained using a multiclass machine-learning algorithm. In some embodiments, the multiclass machine-learning algorithm comprises a support vector machine learning algorithm or a nearest-neighbor machine-learning algorithm, a deep-learning algorithm, an extreme classification algorithm, a recursive leaning algorithm, a hierarchical learning algorithm, a random forest algorithm, or the like. In some aspects, the disclosed AI systems can be operated independent of the machine-learning classification algorithm. In another aspect, the disclosure can work with any supervised learning classification algorithm, including neural networks, making the disclosed techniques widely deployable.

At block 606, the second augmented labels can be decomposed, using the classifier, to generate second classes and second explanations. The decomposition can be performed, in some example embodiments, by un-concatenating the augmented label to its corresponding classification and explanation. In one or more embodiments, the decomposition can be performed by performing an inverse function of the original function that was used to combine or merge the explanation and the classification. In some aspects, the inverse function can take the form of an inverse hashing method, or any other suitable method or technique.

At block 608, a recommendation to a user can be made. In some aspects, the recommendation can be presented to the user via a user's device, for example, a smartphone, a laptop, a computer, or the like. In some aspects, the user can provide feedback, for example, via the device. The user can specify, for example, whether the recommendation was justified and well explained. For example, the user can score the explanation and how well it corresponds to the given situation (e.g., the feature vector and/or the corresponding classification/justification). The score can be, for example, a score on a scale of 1 to 10, where 1 represents a poor justification and/or explanation, and 10 represents an excellent explanation. Such feedback can be used to improve the training phase of the AI system and algorithms, for example, by providing additional or modified training data sets for further optimization of the AI system.

Figure 7:
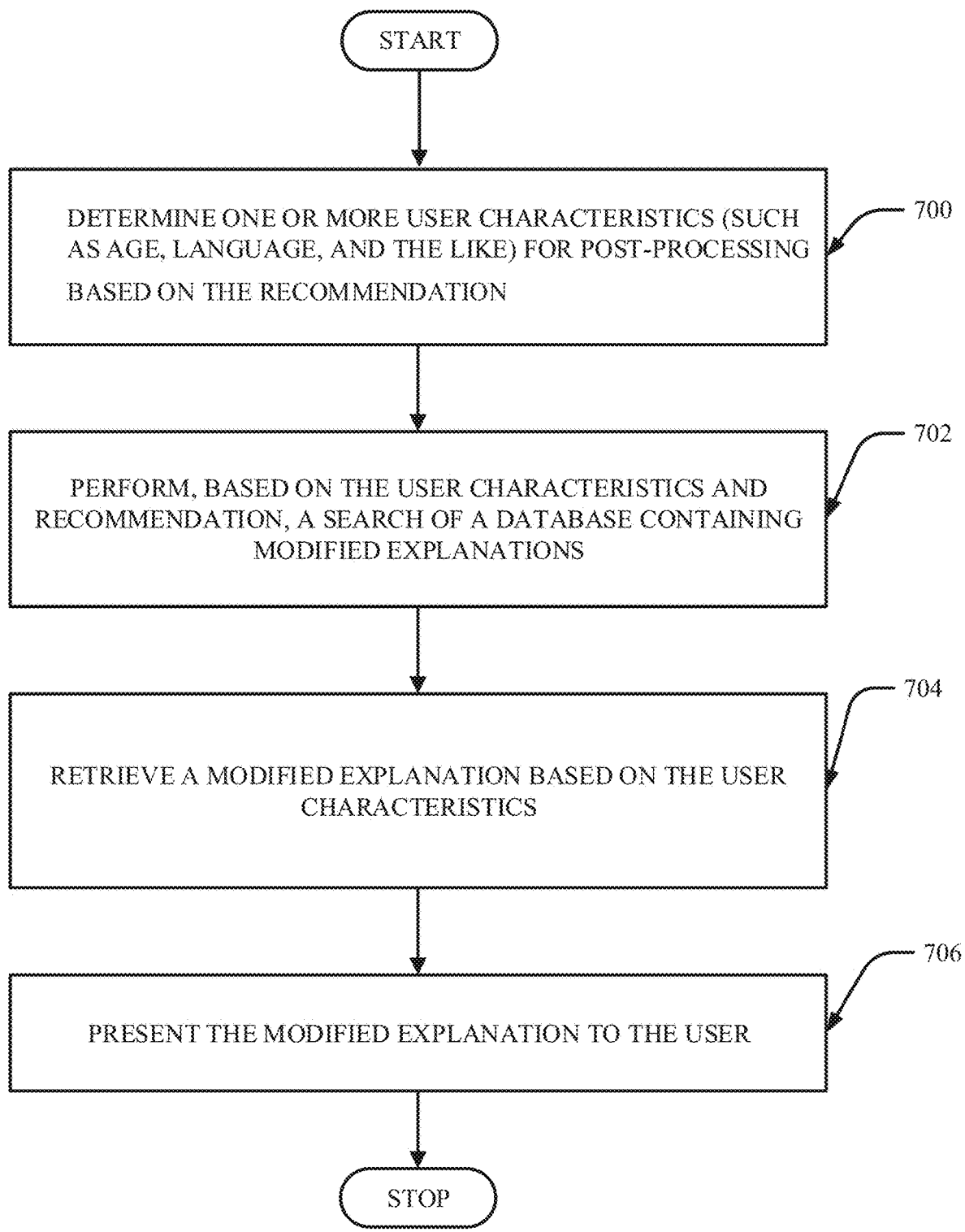
FIG. 7 shows a diagram of another example flowchart for operating aspects of the AI systems and algorithm, in accordance with example embodiments of the disclosure.

FIG. 7 shows a diagram of a further example flowchart for operating aspects of the AI system and algorithm, in accordance with example embodiments of the disclosure. Repetitive description of like elements employed in one or more embodiments described herein is omitted for sake of brevity. At block 700, one or more user characteristics (such as age, language, and the like) can be determined for post-processing based on the recommendation. In some aspects, the recommendation along with the explanation for post-processing can be provided to a post-processing filter. The post-processing filter can, at, can determine a given user characteristic, for example, based on a user profile. The user-profile can be provided by a user, or may be provided via communication with a database, for example, a network database. The database can include a database stored or hosted on a cloud computing platform.

At block 702, a search of a database containing modified explanations can be performed based on the user characteristics and recommendation. In some aspects, the post-processing filter can have access to a database including a table of information, for example, a look-up table. In some embodiments, the look-up table can include a column of feature vectors, for example, including feature vectors X1, X2, and X3. In some embodiments, the look-up table can include a column of classifications, for example, including classifications Y1, Y2, and Y3. In some embodiments, the look-up table can include a column of first explanations. In one embodiment, the first explanations can include those explanations that were originally provided to the AI system, for example, during the training or recommendation processes. In some embodiments, the look-up table can further include columns of second explanations and third explanations. In one embodiment, the second explanations can include a second variation of the first explanations, and third explanations can include a third variation of the first explanation or the second explanations. In one example, the various explanations and can have the same or similar content, but can be in different languages, described using different terminology and vocabulary, or be provided with different levels of detail for different users.

In some embodiments, the content in the columns of the lookup-table, for example, the columns of explanation can be provided in abbreviated or coded format, for example, using a hashing function. Additionally, any number of internal mappings or memory reduction techniques and algorithms can be used to reduce the amount of data needing to be stored on a storage device, the storage device either associated with the network or provided locally.

At block 704, modified explanations can be retrieved based on the user characteristics. In some aspects, the modified explanations can be retrieved by searching for them in the database or lookup table, using any suitable algorithm. For example, any suitable search algorithm that can be used retrieve information stored within some data structure can be used. Examples of such structures include but are not limited to a linked list, an array data structure, or a search tree. The appropriate search algorithm may depend on the data structure being searched, and may also include prior knowledge about the data (e.g., the training data set, the user profile, and the like).

At block 706, a modified explanation can be presented to the user. In some aspects, the modified explanation can be presented to the user via a user's device, for example, a smartphone, a laptop, a computer, or the like. In some aspects, the user can provide feedback, for example, via the device. The user can specify, for example, whether the modified explanation was more understandable to the user. For example, the user can score the modified explanation and how understandable it was to the user. The score can be, for example, a score on a scale of 1 to 10, where 1 represents a poorly understandable explanation, and 10 represents an easily understandable explanation. Such feedback can be used to improve the AI system and algorithms, for example, by providing additional or modified alternative explanations in the lookup table or database.

In some embodiments, there may be at least three entities that may receive and benefit from explanations provided by the AI systems and algorithms described in connection with FIGS. 1-7. A first entity can include end users, which can include people that will use the recommendation, for example, physicians, judges, loan officers, social workers, and the like. The end users can also include people that may be impacted by the recommendation, for example, patients, arrested individuals, loan seekers, at-risk persons, and the like. In some embodiments, the desire explanations can help such entities understand if they were treated fairly and what factor(s) could be changed to get a different result.

In one or more embodiments, a second entity can include government agencies, which may have the responsibility to protect the rights of their citizens and may therefore benefit from ensuring that decisions are made in a non-discriminatory manner.

In one embodiment, a third entity can include AI system builders and/or stakeholders. Such entities can include technical individuals who own, build, or deploy AI systems, and may therefore want to know if the AI systems are working as expected, how to diagnose and improve it, and possibly gain insight from the AI system's decisions.

In some embodiments, the motivations and expectations behind each entity's needs for an explanation can be used to ensure that the explanations satisfy the entity's needs. For example, the third entity may need a more detailed explanation of the system's inner workings in order to take action. In comparison the second entity may benefit from a presentation by the AI system that the process, including the training data sets, is unbiased and therefore does not discriminate.

In some embodiments, while ensuring fairness may be a motivation for requesting explanations, providing an explanation does not necessarily guarantee a system will be fair and you can have fair systems that don't produce explanations. In some embodiments, the impact of a decision can vary greatly, and therefore impact of a decision can be a factor in the decision-making processes described herein. For example, choosing a particular healthcare treatment, denying a promotion, or suggesting a sentencing can have consequences for the entities involved, both directly and indirectly. In contrast, decisions regarding a type of advertisement to show, what news story to recommend, or what movie to watch next may not be as consequential of decisions for the entities involved. Accordingly, there may be a spectrum on the impact an automated decision can have and can be included in algorithms described herein to determine the decisions. In some embodiments, the higher the impact on the entities, the more likely there may be a need for explanations for the first and second entities. Moreover, the third entity may have a vested interest in AI systems, for example, AI systems that bring value to society or satisfy a business need.

As mentioned, one or more databases used in connection with the disclosure can include a database stored or hosted on a cloud computing platform. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
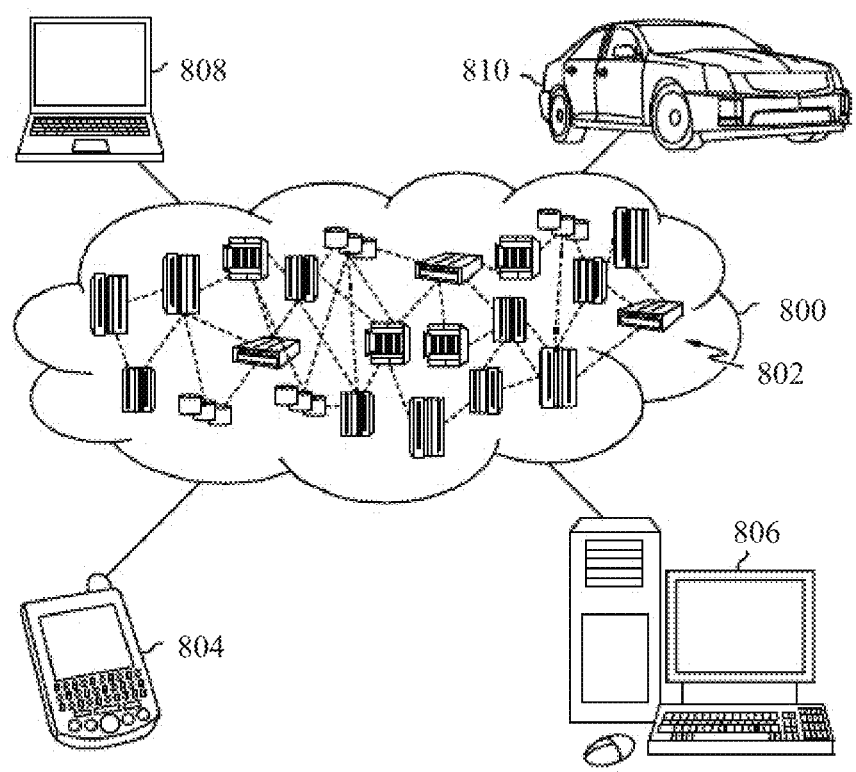
FIG. 8 illustrates a block diagram of an example, non-limiting operating environment in which one or more embodiments described herein can be facilitated.

Referring now to FIG. 8, illustrative cloud computing environment 800 is depicted. Repetitive description of like elements employed in other embodiments described herein is omitted for sake of brevity. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
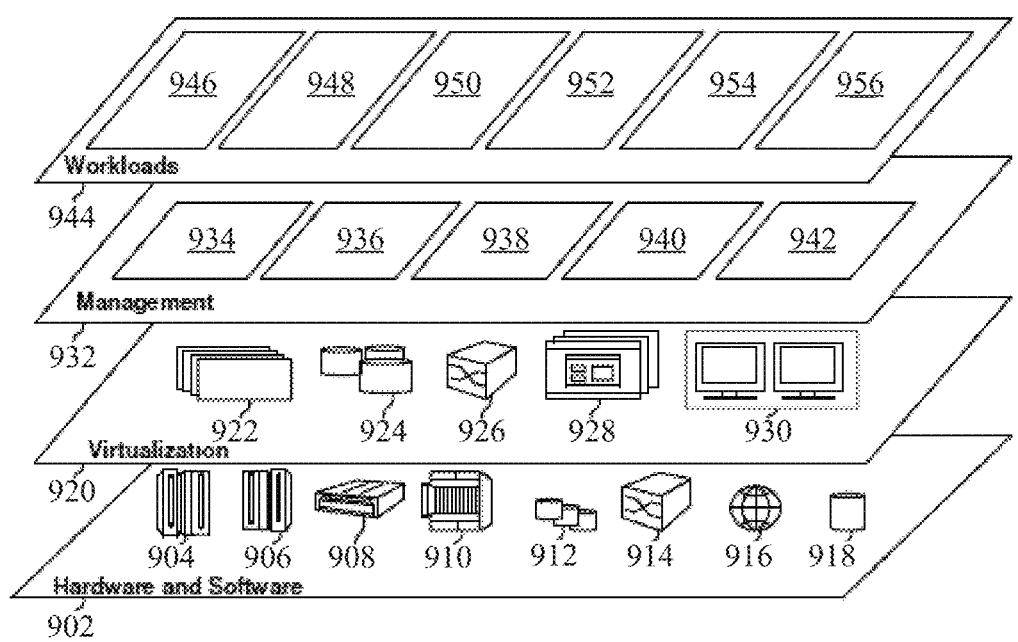
FIG. 9 depicts a cloud computing environment in accordance with one or more embodiments described herein.

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture-based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and assessing an entity's susceptibility to a treatment service 956. Various embodiments of the present invention can utilize the cloud computing environment described with reference to FIGS. 8 and 9 to determine a trust disposition value associated with one or more entities and/or determine the susceptibility of the one or more entities to one or more treatment services based on the trust disposition value.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
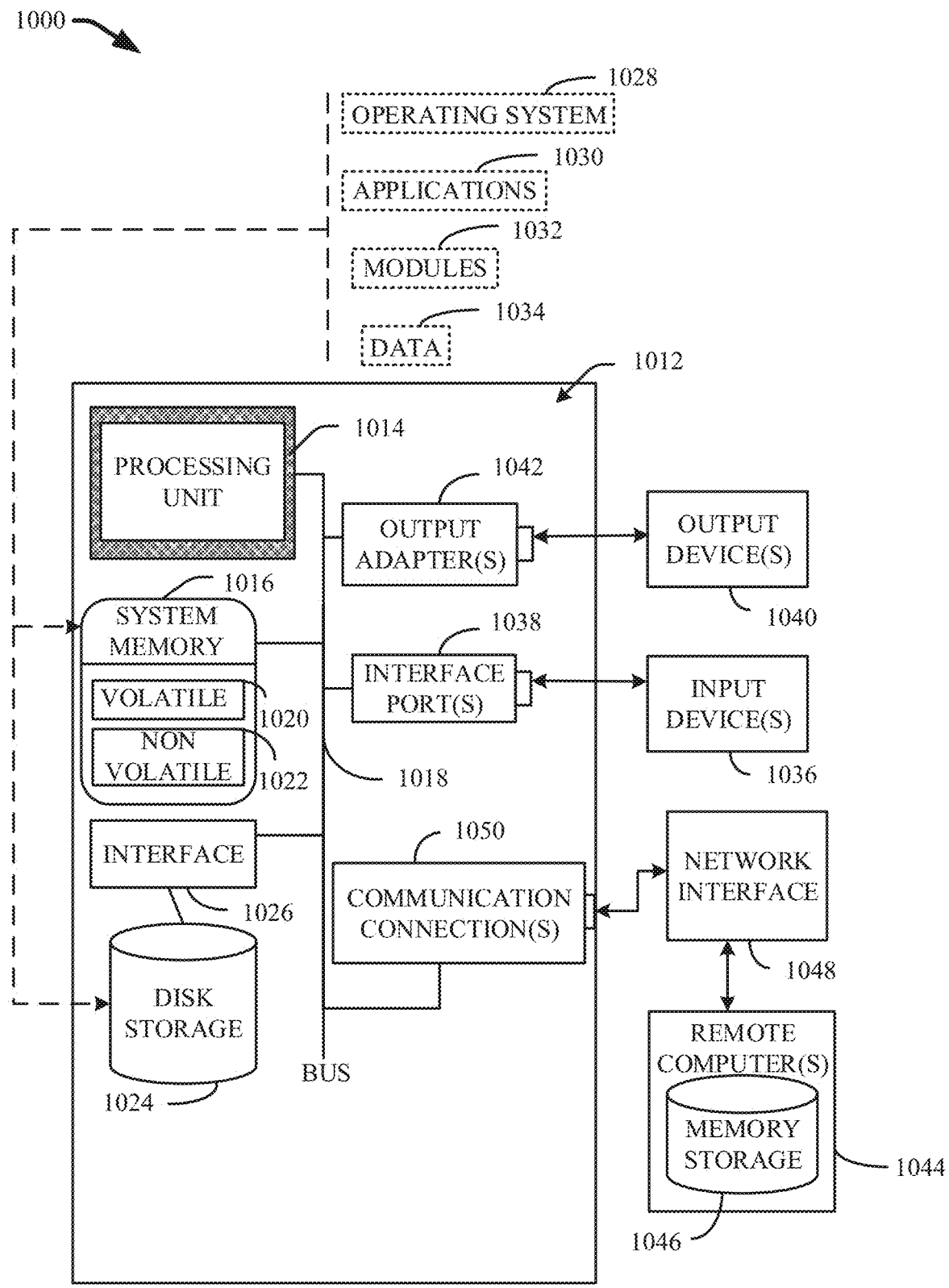
FIG. 10 depicts abstraction model layers in accordance with one or more embodiments described herein.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program components 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, component, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules or components. Generally, program modules or components include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules or components can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components;
a processor, operably coupled to the memory, that executes the computer-executable components stored in the memory, wherein the computer-executable components comprise:
a training component that receives a first training dataset comprising first feature vectors, first classes and first explanations, and a combination component that combines the first classes and the first explanations to produce first augmented labels and a second training dataset that comprises the first feature vectors and the first augmented labels;
a classifier, trained on the second training dataset, that analyses second feature vectors and generates second augmented labels; and
a decomposing component that decomposes the second augmented labels, using the classifier, to generate second classes and second explanations.

2. The system of claim 1, wherein the first explanations comprise one or more of: a number, a text string, an image file, an audio file, or a video file.

3. The system of claim 1, wherein the first explanations are at least partially provided from a crowd-sourcing process for improved processing efficiency.

4. The system of claim 1, wherein the classifier is trained using a multiclass machine-learning algorithm.

5. The system of claim 1, wherein the multiclass machine-learning algorithm comprises a support vector machine learning algorithm, a nearest-neighbor machine-learning algorithm, a deep-learning algorithm, an extreme classification algorithm, a recursive leaning algorithm, a hierarchical learning algorithm, or a random forest algorithm.

6. The system of claim 1, wherein a complexity metric of the second explanations is less than or equal to a complexity-capability metric associated with a user.

7. The system of claim 1, wherein the second explanations use one or more terms of art related to a field associated with the first dataset.

8. A computer-implemented method, comprising:
using a processor to execute computer executable instruction stored in memory to carry out the following acts:
receiving, by a training component operatively coupled to the processor, a first training dataset comprising first feature vectors, first classes and first explanations, and combining, by a combination component operatively coupled to the processor, the first classes and the first explanations to produce first augmented labels and a second training dataset that comprises the first feature vectors and the first augmented labels;
using, by a recommendation component operatively coupled to the processor, a classifier, trained on the second training dataset, to analyse second feature vectors and generate second augmented labels; and
decomposing, by a decomposition component operatively coupled to the processor, the second augmented labels, using the classifier, to generate second classes and second explanations.

9. The computer-implemented method of claim 8, wherein the first explanations comprise one or more of a number, a text string, an image file, an audio file, or a video file.

10. The computer-implemented method of claim 8, wherein the first explanations are at least partially provided from a crowd-sourcing process for improved processing efficiency.

11. The computer-implemented method of claim 8, wherein the classifier is based on a multiclass machine-learning model.

12. The computer-implemented method of claim 8, wherein the multiclass machine-learning algorithm comprises a support vector machine learning algorithm, a nearest-neighbor machine-learning algorithm, a deep-learning algorithm, an extreme classification algorithm, a recursive leaning algorithm, a hierarchical learning algorithm, or a random forest algorithm.

13. The computer-implemented method of claim 8, wherein a complexity metric of the second explanations is less than or equal to a complexity-capability metric associated with a user.

14. The computer-implemented method of claim 8, wherein the second explanations use one or more terms of art related to a field associated with the first dataset.

15. A computer program product for providing an explanation to a user, comprising a computer readable storage medium having program instructions embodied therewith, the program instructions executable by a processor to cause the processor to:
receive, by a training component operatively coupled to the processor, a first training dataset comprising first feature vectors, first classes and first explanations, and combine, by a combination component operatively coupled to the processor, the first classes and the first explanations to produce first augmented labels and a second training dataset that comprises the first feature vectors and the first augmented labels;
use, by a recommendation component operatively coupled to the processor, a classifier, trained on the second training dataset, to analyse second feature vectors and generate second augmented labels; and decompose, by a decomposition component operatively coupled to the processor, the second augmented labels, using the classifier, to generate second classes and second explanations.

16. The computer program product of claim 15, wherein the first explanations comprise one or more of a number, a text string, an image file, an audio file, or a video file.

17. The computer program product of claim 15, wherein the classifier is based on a multiclass machine-learning model.

18. The computer-program product of claim 17, wherein the multiclass machine-learning algorithm comprises a support vector machine learning algorithm, a nearest-neighbor machine-learning algorithm, a deep-learning algorithm, an extreme classification algorithm, a recursive leaning algorithm, a hierarchical learning algorithm, or a random forest algorithm.

19. The computer program product of claim 15, wherein a complexity metric of the second explanations is less than or equal to a complexity-capability metric associated with a user.

20. The computer-implemented method of claim 15, wherein the second explanations use one or more terms of art related to a field associated with the first dataset.

\* \* \* \* \*